(12) United States Patent
Yamaya

(10) Patent No.: US 8,749,698 B2
(45) Date of Patent: Jun. 10, 2014

(54) LENS UNIT, IMAGING APPARATUS INCLUDING THE LENS UNIT, AND IMAGING METHOD

(75) Inventor: Hiroyuki Yamaya, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 368 days.

(21) Appl. No.: 12/906,347

(22) Filed: Oct. 18, 2010

(65) Prior Publication Data

US 2011/0102618 A1 May 5, 2011

(30) Foreign Application Priority Data

Oct. 19, 2009 (JP) ................................. 2009-240462

(51) Int. Cl.
*H04N 5/225* (2006.01)

(52) U.S. Cl.
USPC .......................................................... 348/360

(58) Field of Classification Search
CPC . H04N 5/23209; H04N 5/2254; G03B 17/14; G03B 17/12
See application file for complete search history.

(56) References Cited

U.S. PATENT DOCUMENTS

| | | | | |
|---|---|---|---|---|
| 7,259,786 | B2 * | 8/2007 | Shimizu ...................... | 348/231.6 |
| 7,619,661 | B2 * | 11/2009 | Takahashi et al. .......... | 348/224.1 |
| 2003/0193602 | A1 * | 10/2003 | Satoh et al. ............... | 348/333.12 |
| 2005/0212921 | A1 * | 9/2005 | Horii ......................... | 348/211.14 |
| 2007/0098385 | A1 * | 5/2007 | Tanaka et al. .................... | 396/56 |
| 2007/0147815 | A1 * | 6/2007 | Tanaka ............................. | 396/56 |
| 2008/0218601 | A1 * | 9/2008 | Suemoto ................... | 348/231.99 |

FOREIGN PATENT DOCUMENTS

| | | |
|---|---|---|
| JP | 2005-278021 | 10/2005 |
| JP | 2005-286501 | 10/2005 |
| JP | 2007-110314 | 4/2007 |
| JP | 2007-135156 | 5/2007 |
| JP | 2007-142559 | 6/2007 |
| JP | 2007-300550 | 11/2007 |
| JP | 2010-177980 | 8/2010 |

OTHER PUBLICATIONS

Japanese Office Action (2009-240462) dated Jun. 18, 2013.

* cited by examiner

*Primary Examiner* — Luong T Nguyen
(74) *Attorney, Agent, or Firm* — Oblon, Spivak, McClelland, Maier & Neustadt, L.L.P.

(57) ABSTRACT

An imaging apparatus includes a lens unit, a body unit detachably attached to the lens unit, and an interface unit configured to connect the lens unit and the body unit so as to be capable of communicating with each other, the interface unit having a bidirectional communication interface and a unidirectional interface. The lens unit includes an optical lens configured to transmit light from an object, an imaging device configured to form an image with the light, and an image processing section configured to generate image data based on an output of the imaging device. The lens unit is configured to receive setting information to be used in the image processing section for generating the image data from the body unit via the bidirectional interface of the interface unit, generate the image data based on the received setting information, send notification information to be used by the body unit for receiving the image data to the body unit via the bidirectional interface of the interface unit, and send the image data to the body unit via the unidirectional interface of the interface unit after sending the notification information.

20 Claims, 12 Drawing Sheets

LENS UNIT, IMAGING APPARATUS INCLUDING THE LENS UNIT, AND IMAGING METHOD

CROSS REFERENCE TO RELATED APPLICATIONS

The present application is based on and claims priority from Japanese Application Number 2009-240462, filed on Oct. 19, 2009, the disclosure of which is hereby incorporated by reference herein in its entirety.

BACKGROUND OF THE INVENTION

1. Field of the Invention

The present invention relates to an imaging apparatus, more specifically, an imaging apparatus in which a lens unit and a body unit are detachably attached to each other and configured to be connected with each other by a plurality of different communication interfaces, and also relates to a lens unit which is capable of efficiently sending image data to a body unit, an imaging apparatus including the lens unit, and an imaging method.

2. Description of the Related Art

There is known an imaging apparatus including a lens unit housing a photographing lens, an imaging device, and a CPU (Central Processing Unit) configured to perform a predetermined image processing, and a body unit capable of detachably connecting the lens unit, the body unit having a CPU configured to perform a predetermined image processing, and a recording section for image data.

In such an imaging apparatus, it is necessary to transfer various data between the CPUs mounted on the lens unit and the body unit. Therefore, the imaging apparatus is configured such that communication between the CPUs is performed via a shared memory.

That is, the conventional imaging apparatus has a configuration in which the lens unit and the body unit are connected by a data bus.

In order that the lens unit and the body unit are connected by the data bus and have a configuration to be capable of communicating with each other, there is a problem in that a resist on a substrate is exposed in a part to join the lens unit and the body unit.

Further, in the connection by the data bus, a generalized connector cannot be used for a connection interface. Therefore, there is a problem in that the manufacturing cost becomes high.

Furthermore, a circuit configuration of a part connected by the data bus becomes complicated. Therefore, there is a problem in that the number of components of the part connected by the data bus increases.

In order to solve such problems, there is known an imaging apparatus configured such that a lens unit is connected to a body unit by a generalized serial port (for example, refer to Japanese Patent Laid-Open Publication Number 2007-110314).

An imaging apparatus described in Japanese Patent Laid-Open Publication Number 2007-110314 is configured such that transfer of data between CPUs included in a lens unit and a body unit is performed by a serial driver for a control to perform a bidirectional communication and a serial driver for an image to perform a unidirectional communication from the lens unit to the body unit.

When operating in a body side recording mode, the imaging apparatus in Japanese Patent Laid-Open Publication Number 2007-110314 sends image data of a formed image from the lens unit to the body unit via the serial driver for the image.

Further, when operating in a lens side recording mode, the imaging apparatus in Japanese Patent Laid-Open Publication Number 2007-110314 records the image data of the formed image on a recording section included in the lens unit, generates a thinned data image or reduced data image based on the recorded image data, and sends the thinned data image to the body unit to be displayed on a monitor.

Since data volume of the thinned data image is reduced compared to that of an original image, even the generalized serial driver for the control is capable of sending the thinned data image.

As mentioned above, volume of the image data to be sent from the lens unit to the body unit is reduced, and thereby the imaging apparatus disclosed in Japanese Patent Laid-Open Publication Number 2007-110314 can perform the transfer of the image data between the CPUs by use of the generalized serial driver for the control.

However, in order to send the image data by use of the generalized serial driver for the control, it is necessary to determine in advance a data format of the image data to be sent from the lens unit to the body unit. That is, when the thinned data image is generated, it is necessary to perform a processing to convert the image data into data in a single data format. Therefore, the data format of the image data to be sent from the lens unit to the body unit is fixed and cannot be changed, and there is a problem in that a restriction arises to a type of the data format of the image data to be handled and a data size, that is, an image size of the image data to be handled.

Further, a problem arises in that image quality is lowered because data of the thinned data image is used as the image data to be sent and/or received.

Normally, in an imaging apparatus including a lens unit housing an imaging device, and a body unit which is capable of detachably connecting the lens unit, when the lens unit is replaced by a different lens unit, the imaging device housed in the lens unit is also replaced by a different imaging device, and in a case where the different imaging device is used, a different data format and a different data size of image data are used.

That is, in an imaging apparatus which is constituted such that a lens unit and a body unit are detachably attached to each other, since a data format and a data size of image data to be sent from the lens unit to the body unit are fundamentally in a variety of types, it is preferable that the image data to be sent from the lens unit to the body unit also correspond to the various data formats and the various data sizes.

However, in a case of providing with the body unit a function corresponding to the image data of a plurality of the data formats and the data sizes, a cost thereof becomes high. Further, although there is also a way to handle the various data formats by updating a processing program in accordance with the lens unit to be attached, an operation becomes cumbersome and inconvenient.

SUMMARY OF THE INVENTION

An object of the present invention is to provide an imaging apparatus which is constituted such that a lens unit and a body unit are detachably attached to each other, and in which the lens unit and the body unit are connected by a plurality of different communication interfaces, and is to provide the lens unit in which a data type of image data of a formed image to be sent to the body unit is not limited, and which can efficiently send the image data to the body unit, an imaging apparatus including the lens unit, and an imaging method.

To achieve the above object, an imaging apparatus according to an embodiment of the present invention includes a lens unit, a body unit detachably attached to the lens unit, and an interface unit configured to connect the lens unit and the body unit so as to be capable of communicating with each other, the interface unit having a bidirectional communication interface and a unidirectional interface. The lens unit includes an optical lens configured to transmit light from an object, an imaging device configured to form an image with the light, and an image processing section configured to generate image data based on an output of the imaging device. The lens unit is configured to receive setting information to be used in the image processing section for generating the image data from the body unit via the bidirectional interface of the interface unit, generate the image data based on the received setting information, send notification information to be used by the body unit for receiving the image data to the body unit via the bidirectional interface of the interface unit, and send the image data to the body unit via the unidirectional interface of the interface unit after sending the notification information.

DETAILED DESCRIPTION OF THE PREFERRED EMBODIMENTS

First Embodiment

Hereinafter, a lens unit, an imaging apparatus including the lens unit, and an imaging method used in the imaging apparatus, according to an embodiment of the present invention will be explained with reference to the accompanying drawings FIGS. 1A to 11. Each of FIGS. 1A and 1B is an external perspective view showing an example of an imaging apparatus including a lens unit and a body unit detachably attached to the lens unit, according to an embodiment of the present invention.

Figure 1A:
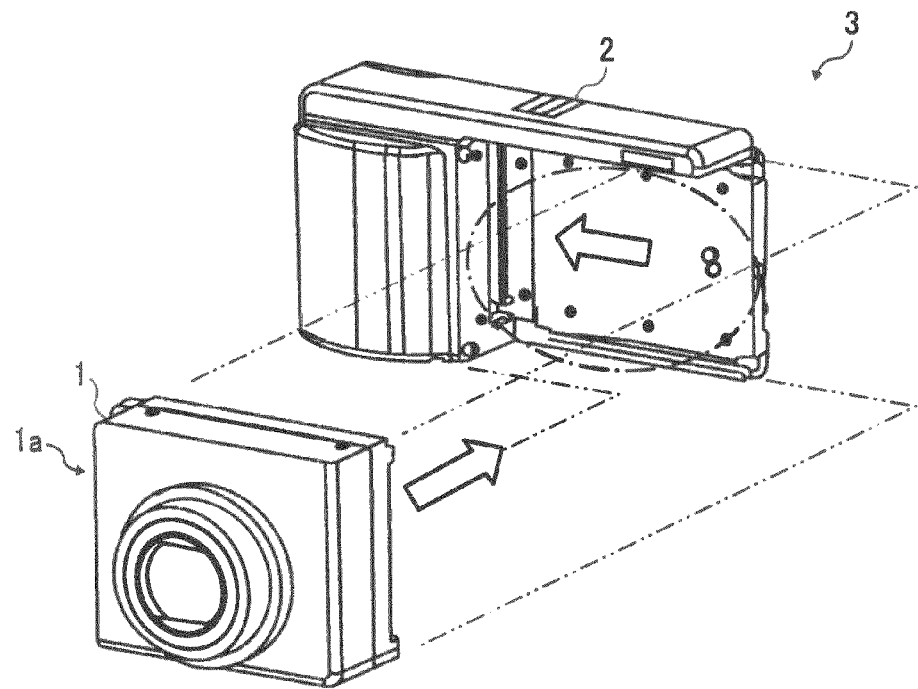
FIGS. 1A and 1B are external perspective views showing examples of a lens unit and an imaging apparatus including the lens unit, according to an embodiment of the present invention.
Figure 1B:
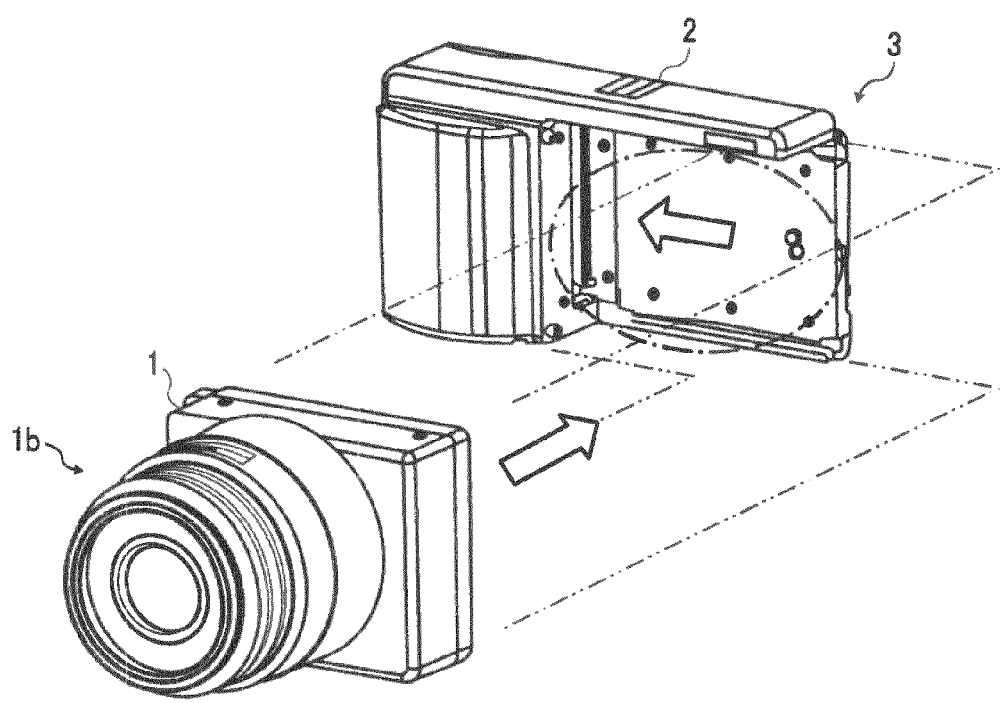

In each of FIGS. 1A and 1B, reference numbers 1 and 2 indicate the lens unit and the body unit, respectively. A reference number 3 indicates the imaging apparatus in which the lens unit 1 is attached to the body unit 2 to be unified or combined.

The lens unit 1 has a variety of types in accordance with an imaging lens and an imaging device which are included therein. A user may select the lens unit 1 as appropriate and attach the lens unit 1 to the body unit 2. For example, each of a lens unit 1a shown in FIG. 1A, in which a single focus lens is installed and a lens unit 1b shown in FIG. 1B, in which a zoom lens is installed is attached to the body unit 2, and thereby it is possible to form an image by taking advantage of a characteristic of each of the imaging lenses.

Next, examples of hardware configurations of the lens unit according to an embodiment of the present invention and the body unit detachably connected with the lens unit, the body unit constituting the imaging apparatus according to an embodiment of the present invention, will be explained with reference to block diagrams of FIGS. 2 to 4.

The imaging apparatus 3 according to an embodiment of the present invention includes, for example, the lens unit 1, the body unit 2 detachably attached to the lens unit 1, and the interface unit 5 configured to connect the lens unit 1 and the body unit 2 so as to be capable of communicating with each other, the interface unit 5 having a bidirectional communication interface and a unidirectional interface. The lens unit 1 includes an optical lens, for example a focus lens, configured to transmit light from an object, an imaging device configured to form an image with the light, and an image processing section, for example a main CPU (Central Processing Unit) for the lens unit 1, configured to generate image data based on an output of the imaging device. The lens unit 1 is configured to receive setting information to be used in the image processing section for generating the image data from the body unit 2 via the bidirectional interface of the interface unit 5, generate the image data based on the received setting information, send notification information to be used by the body unit 2 to the body unit 2 via the bidirectional interface of the interface unit 5, and send the image data to the body unit 2 via the unidirectional interface of the interface unit 5 after sending the notification information. The body unit 2 is configured to receive the image data sent from the lens unit 1 by use of the notification information sent from the lens unit 1.

It is desirable that the image data be in a computer-readable image file format, for example a JPEG (Joint Photographic Experts Group) format, a MPEG (Moving Picture Experts Group) format, or the like.

It is desirable that the body unit 2, for example, an image processing section of the body unit 2 include a function to convert the image data into data in the computer-readable image file format and to record the data in the computer-readable image file format.

Figure 2A:
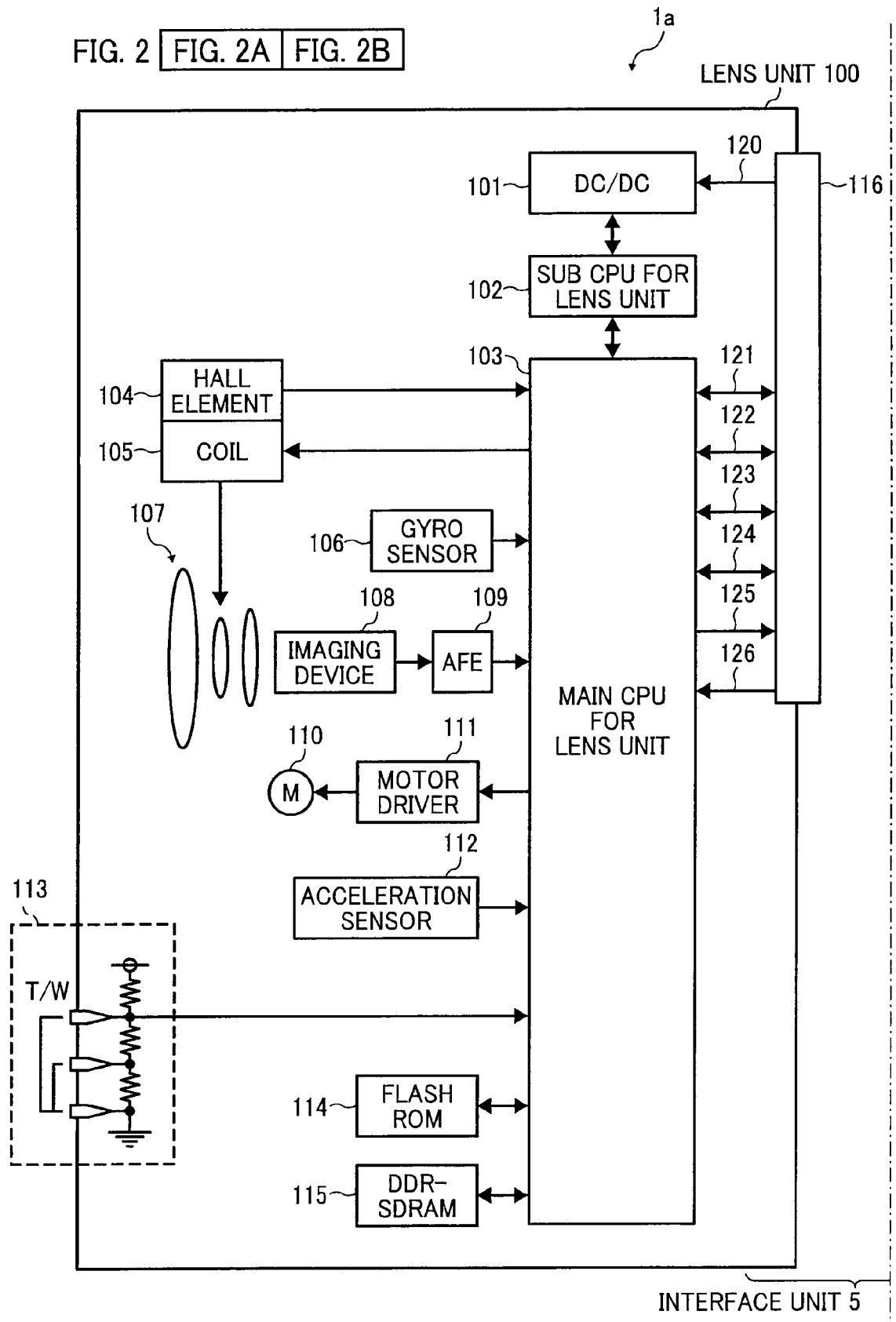
FIG. 2 is a block diagram showing an example of a hardware configuration of a lens unit and a body unit constituting an imaging apparatus according to an embodiment of the present invention.
Figure 2B:
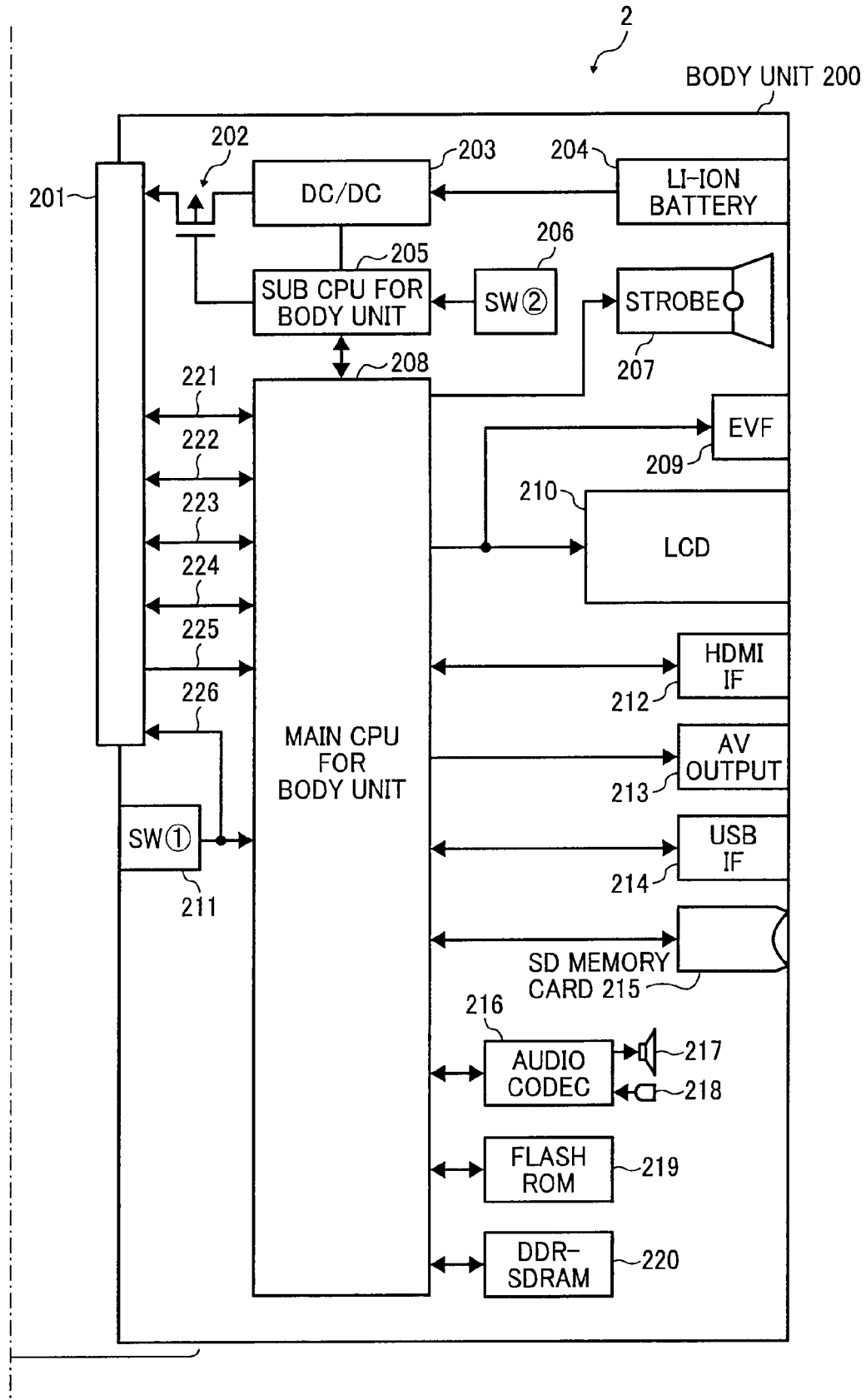

A lens unit 100 as an example of the lens unit 1a as mentioned above and a body unit 200 as an example of the body unit 2 are shown in FIG. 2. As shown in FIG. 2, a joint connector 116 of the lens unit 100 and a joint connector 201 of the body unit 200 are connected, and thereby the lens unit 100 and the body unit 200 are electrically-connected with each other and constitute the imaging apparatus 3.

The lens unit 100 includes a lens group 107 having the focus lens, an imaging device 108 configured to form an object image by receiving light from an object transmitted through the lens group 107, convert a light signal of the object image into an electrical signal, and output the electrical signal, an AFE (Analog Front-End) 109 configured to convert the signal output from the imaging device 108, that is, convert an analog image signal into a digital image signal and amplify the converted digital image signal, and a main CPU 103 configured to generate image data by performing predetermined image processings such as a processing for converting RGB data of the digital image signal into YUV data and a processing for a compression coding of the YUV data in the JPEG format or the MPEG format, or a processing for generating RAW data. The main CPU 103 is a so-called image processing engine for the lens unit 100.

Further, the lens unit 100 includes an interunit interface to be electrically-connected with the body unit 200.

The interunit interface in the lens unit 100 includes the joint connector 116 configured to be connected with the joint connector 201 of the body unit 200, a control signal interface from/to the body unit 200, shown by a reference number 121, a serial signal interface shown by a reference number 122, the bidirectional communication interface shown by a reference number 123, an SDIO (Secure Digital Input Output) signal interface shown by a reference number 124, a release switch signal input interface shown by a reference number 126, and an image signal sending interface, which is the unidirectional interface, shown by a reference number 125.

Furthermore, the lens group 107 is housed in a lens barrel, and the lens unit 100 includes a motor 110 configured to be used for extending and collapsing the lens barrel and a motor driver 111 configured to control the motor 110. The motor driver 111 is controlled by a control signal received from the body unit 200 via the control signal interface 121.

According to the above-mentioned configuration, depending on types of interchangeable lenses, various operating controls such as collapsing the lens barrel when power of the imaging apparatus 3 is turned off, and performing a variable magnification operation by driving the lens barrel with pressing a not-illustrated button may be performed.

Moreover, the lens unit 100 is supplied with electrical power 120 from the body unit 200, and includes a DC-DC (direct current to direct current) converter 101 configured to generate electrical power necessary for each of various operations of the lens unit 100 from the electrical power 120 and a sub CPU 102 for the lens unit 100 configured to control the DC-DC converter 101 by detecting the electrical power 120.

In addition, the lens unit 100 includes a detection circuit 113 configured to detect a teleconverter lens and a wide converter lens which are capable of being attached outside the lens unit 100.

Furthermore, the lens unit 100 includes a gyro sensor 106 configured to detect tilt of the imaging apparatus 3, an acceleration sensor 112 configured to detect acceleration applied to the imaging apparatus 3, a coil 105 configured to drive the lens group 107 in accordance with the tilt detected by the gyro sensor 106 and the acceleration detected by the acceleration sensor 112, and a Hall element 104 configured to detect a driving amount of the coil 105.

It is possible to fulfill a function to prevent an image blur from occurring by camera shake due to a hand movement by the gyro sensor 106, the acceleration sensor 112, the coil 105, and the Hall element 104, mentioned above.

Software for performing the image processings and the like in the lens unit 100 is stored on a flash ROM (Read Only Memory) 114 (hereinafter, referred to as a ROM 114).

Further, the lens unit 100 includes a DDR-SDRAM (Double-Data-Rate Synchronous Dynamic Random Access Memory) 115 (hereinafter, referred to as a RAM 115) configured to function as a ring buffer to accumulate the image data generated in the main CPU 103 based on the signal output from the imaging device 108. The RAM 115 functions also as a work area of the software mentioned above.

In FIG. 2, the body unit 200 includes an interunit interface to be electrically-connected with the lens unit 100.

The interunit interface in the body unit 200 includes the joint connector 201 configured to be connected with the joint connector 116 of the lens unit 100, a control signal interface from/to the lens unit 100, shown by a reference number 221, a serial signal interface shown by a reference number 222, the bidirectional communication interface shown by a reference number 223, an SDIO signal interface shown by a reference number 224, a release switch signal output interface shown by a reference number 226, and an image signal receiving port, which is the unidirectional interface, shown by a reference number 225.

Further, the body unit 200 receives the image data from the lens unit 100 via the image signal receiving port 225 which is the unidirectional interface. The body unit 200 includes a main CPU 208 for the body unit 200 configured to perform, as appropriate, predetermined image processings such as a processing for converting the received image data into YUV data, a processing for a compression coding of the YUV data in the JPEG format or the MPEG format and a processing for a decompression of the compressed and coded data, or a processing for generating RAW data. The main CPU 208 is a so-called image processing engine for the body unit 200.

Furthermore, the body unit 200 includes a release switch 211 to start a photographing operation of the imaging apparatus 3 by a predetermined operation, an operation switch 206 having upper, lower, right, and left keys and the like which are used for various settings such as operating modes of the imaging apparatus 3, and a sub CPU 205 for the body unit 200 configured to perform a processing for a predetermined setting and the like by detecting an operation of the operation switch 206, and control electrical power supplied from a lithium-ion battery 204 with a DC-DC converter 203 and a power switch 202 which is a switch to supply the electrical power to the lens unit 100.

Software for performing the image processings and an operating control processing in the body unit 200 is stored on a flash ROM 219 (hereinafter, referred to as a ROM 219). Further, the body unit 200 includes a DDR-SDRAM 220 (hereinafter, referred to as a RAM 220) configured to function as a work area used for the image processings and so on.

Further, the body unit 200 includes an audio codec 216, a microphone 218 configured to input an audio signal to the audio codec 216, a speaker 217 configured to output sound from the audio codec 216, a USB (Universal Serial Bus) interface connector 214, an AV (audio-video) output connector 213, an HDMI (High-Definition Multimedia Interface) signal output interface 212, an SD (Secure Digital) memory card 215 which is a storage section detachably attached to the body unit 200 and configured to store an image file of the object image formed by the imaging device 108, a strobe 207 which also functions as a connection circuit in a case where an external strobe is attached to the body unit 200, an LCD (Liquid Crystal Display) 210 and an EVF (Electronic Viewfinder) 209 which are display sections on which the object image is displayed as monitoring during a focusing operation by operating the release switch 211, and on which the image data by photographing are displayed when a photographing operation is performed.

Figure 3:
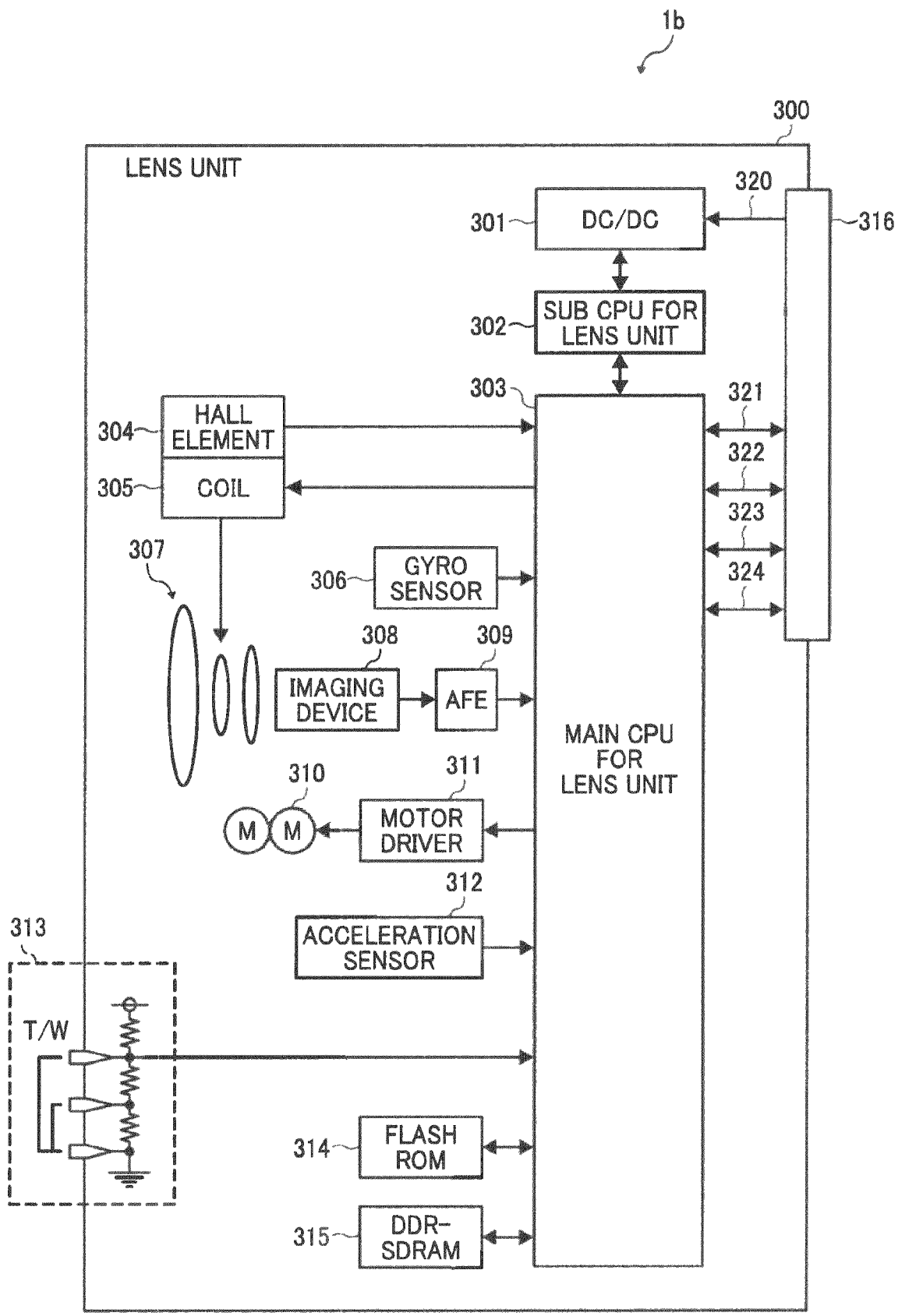
FIG. 3 is a block diagram showing another example of the lens unit according to the present invention.

FIG. 3 is a block diagram showing another example of the lens unit 1 constituting the imaging apparatus 3 according to an embodiment of the present invention. A lens unit 300 as an example of the lens unit 1b as mentioned above is shown in FIG. 3. The lens unit 300 has almost the same configuration as that of the lens unit 100 shown in FIG. 2. The lens unit 300 has a difference in a configuration from the lens unit 100 in that the lens unit 300 includes a zoom lens in a lens group 307 and a motor 310 for zooming to move the zoom lens. The lens unit 300 is configured to allow a focus lens and the zoom lens included in the lens group 307 to perform a predetermined operation by operating a zoom switch (not shown) included in the body unit 200.

In addition, an image signal sending interface constituted of the unidirectional interface is omitted in FIG. 3.

Figure 4:
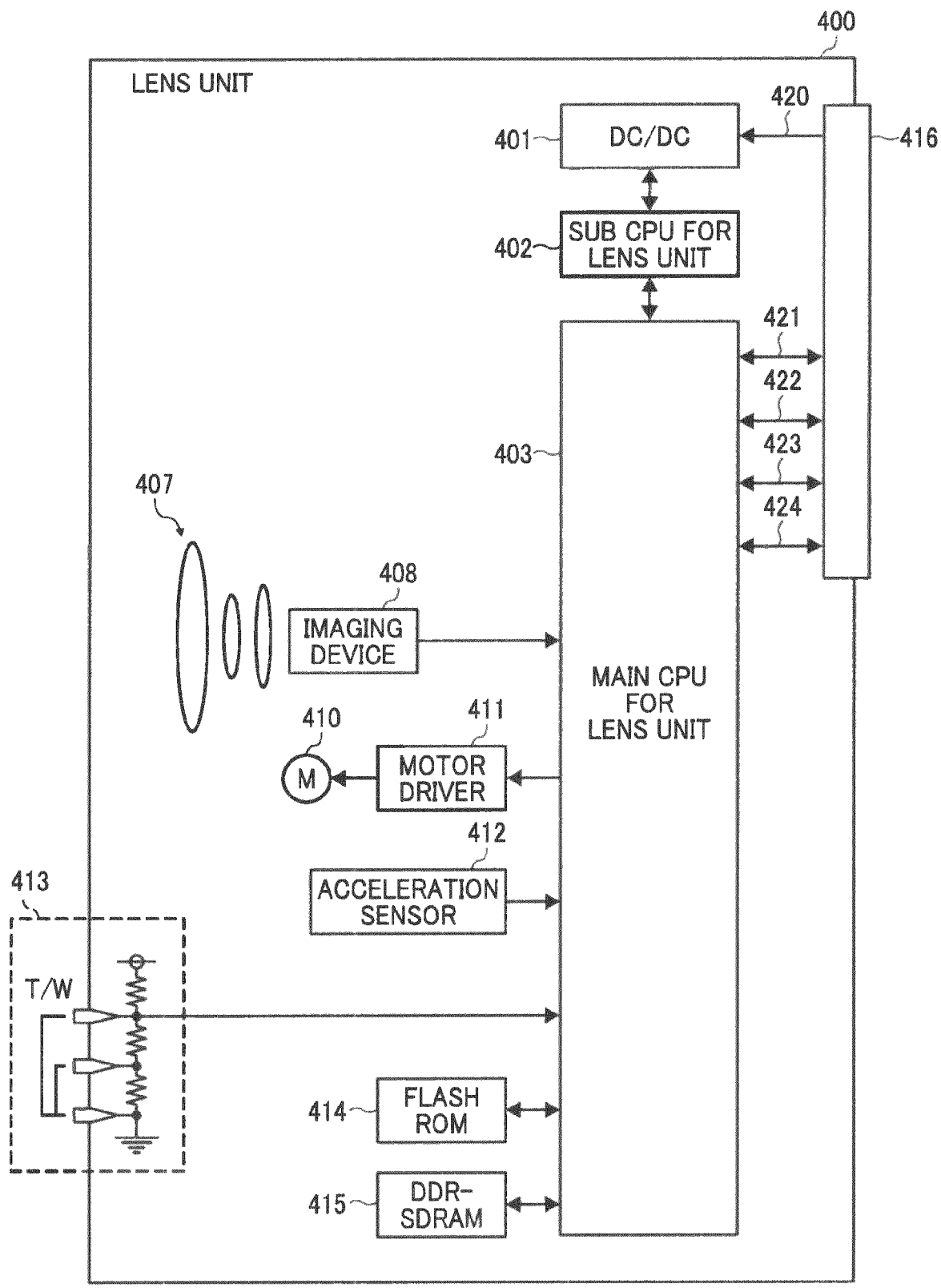
FIG. 4 is a block diagram showing another example of the lens unit according to the present invention.

FIG. 4 is a block diagram showing a lens unit 400 as yet another example of the lens unit 1 constituting the imaging apparatus 3 according to an embodiment of the present invention. In FIG. 4, the lens unit 400 includes a large imaging device 408 and has a difference in a configuration from the lens unit 100 in that the lens unit 400 does not include a configuration corresponding to the Hall element 104, the coil 105, and the gyro sensor 106 which perform an operation for preventing the image blur from occurring by camera shake due to hand movement.

In addition, an image signal sending interface constituted of the unidirectional interface is omitted in FIG. 4.

Figure 5:
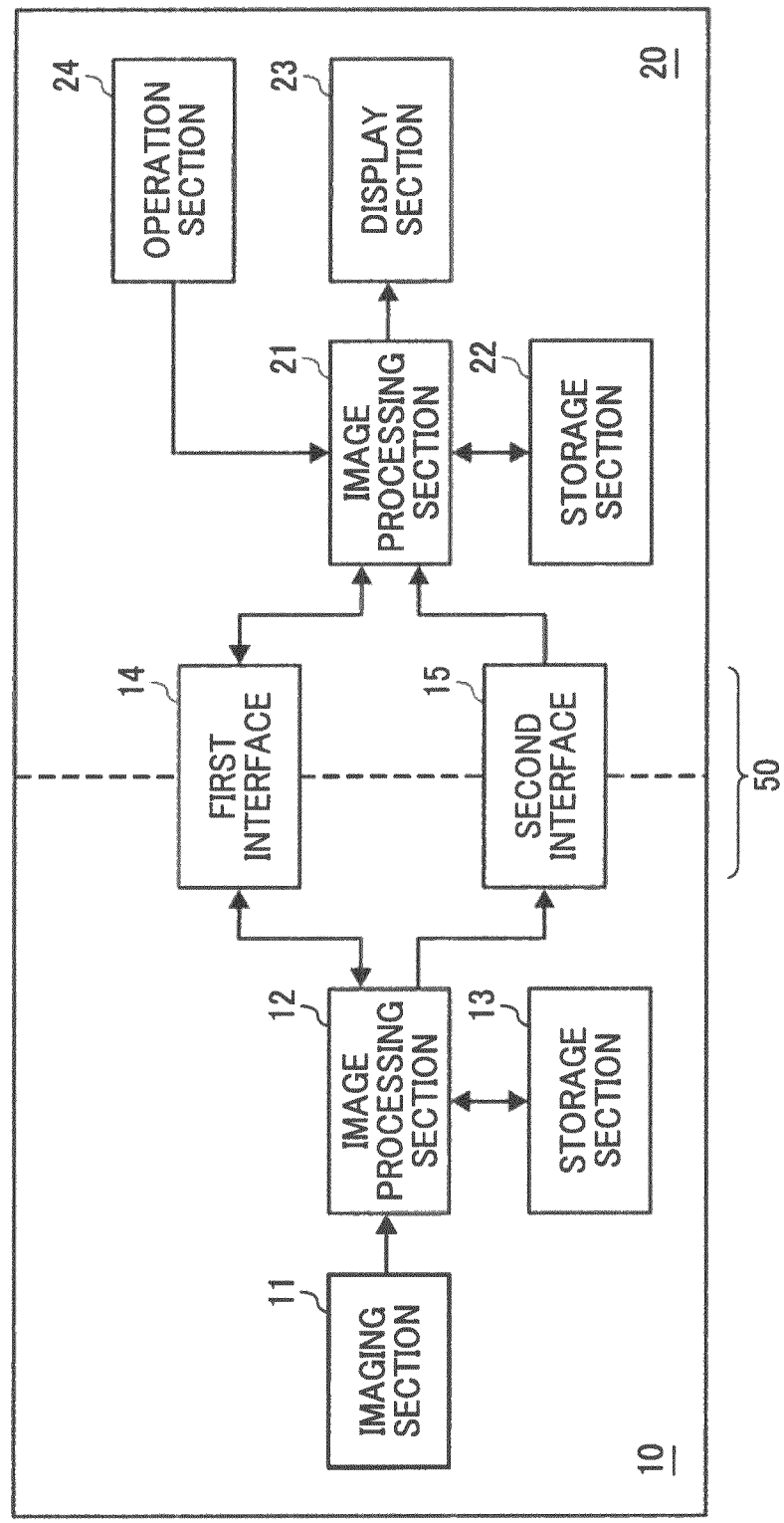
FIG. 5 is a functional block diagram showing an example of a functional configuration of the imaging apparatus according to the present invention.

Next, an imaging method used in the lens unit and the imaging apparatus including the lens unit, according to an embodiment of the present invention, will be explained with reference to the accompanying drawings. In addition, the lens units 100, 300, and 400 include software for performing image processings and the like, respectively, which are stored on flash ROMs 114, 314, and 414 (hereinafter, referred to as ROMs 114, 314, and 414), respectively. The imaging method explained hereinafter is carried out with the software respectively included in the lens units 100, 300, and 400 and various types of hardware respectively included in the lens units 100, 300, and 400, and a body unit 200. Each of sections in a functional block diagram shown in FIG. 5 shows a function which is carried out by cooperation between the software and the hardware. In addition, reference numbers 10 and 20 are used for the lens unit and the body unit, respectively. Further, a reference number 50 is used for the interface unit.

In FIG. 5, the interface unit 50 includes a first interface 14 and a second interface 15. Further, the lens unit 10 includes an imaging section 11 configured to form an object image by use of the lens group 107, the imaging device 108, the AFE 109, and the software stored on the ROM 114, which are included in the lens unit 100, an image processing section 12 configured to perform predetermined image processings and an operating control of the imaging apparatus by use of the main CPU 103 for the lens unit 100 and the software, a storage section 13 configured to allow the RAM 115 to operate as a ring buffer by an operating control of the software, the first interface 14 configured to allow the bidirectional communication between the body unit 200 and the lens unit 100 by the operating control of the software, the first interface 14 including the joint connector 116 and the bidirectional interface 123, and the second interface 15, which is the unidirectional interface, configured to be used for sending image data from the lens unit 100 to the body unit 200 by the operating control of the software, the second interface 15 including the joint connector 116 and the unidirectional interface 125.

In addition, the first interface 14 includes the main CPU 208 for the body unit 200, the joint connector 201, and the bidirectional interface 223, and the second interface 15 includes the main CPU 208 for the body unit 200, the joint connector 201, and the unidirectional interface 225.

On the other hand, the body unit 20 includes an image processing section 21 configured to perform predetermined image processings by use of the main CPU 208 and software of the body unit 200, a storage section 22 configured to allow the RAM 220 to operate as a temporary storage area by an operating control of the software, the storage section 22 including the SD memory card 215 on which the image data received from the lens unit 10 are stored as an image file, a display section 23 including the liquid crystal display (LCD) 210, for example, on which the image data received from the lens unit 10 may be displayed, and an operation section 24 including the operation switch 206, the sub CPU 205, and the release switch 211.

In accordance with the imaging apparatus including the lens unit 10 and the body unit 20 according to this embodiment, the image processing section 12 of the lens unit 10 and the image processing section 21 of the body unit 20 are connected by the interface unit 50 including the first interface 14 which is the bidirectional interface and the second interface 15 which is the unidirectional interface. The image processing section 12 and the image processing section 21 are capable of performing a sending/receiving processing of a variety of information regarding sending/receiving the image data during a sending processing of the image data from the lens unit 10.

Figure 6:
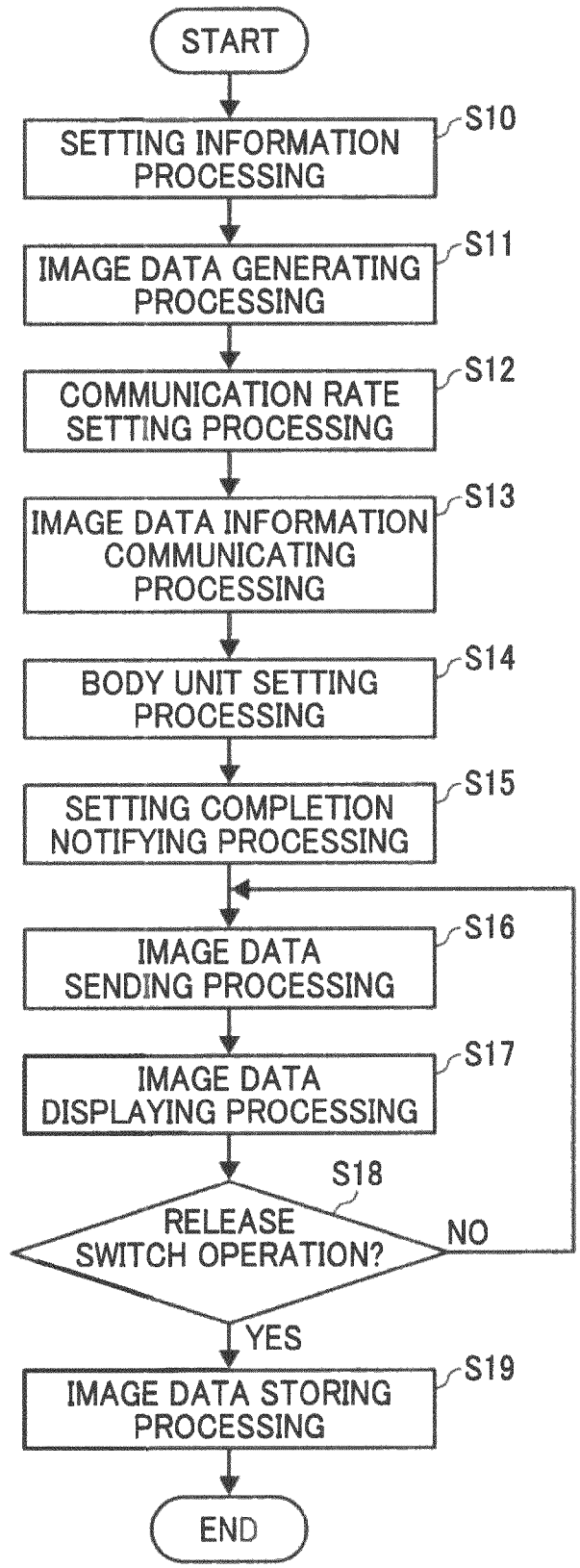
FIG. 6 is a flow chart showing an example of a flow of a processing of an imaging method used in the imaging apparatus according to the present invention.

Next, a flow of the imaging method according to an embodiment of the present invention will be explained with reference to a flow chart of FIG. 6. In FIG. 6, processing steps will be described as S10, S11 and so on, which are consecutive numbers.

At first, when power is on after the lens unit 10 is connected to the body unit 20, or at a timing of a predetermined processing, setting information is sent from the body unit 20 to the lens unit 10 via the first interface 14 (S10).

The lens unit 10 generates the image data based on an output of the imaging section 11 in accordance with the received setting information and temporarily stores the generated image data on the storage section 13 which is the ring buffer (S11). The lens unit 10 sets a transfer rate, that is, a communication rate of the second interface 15 in accordance with the generated image data, that is, the lens unit 10 may determine a data transfer rate of the unidirectional interfaces 125, 225 based on data volume of the image data to be sent via the unidirectional interfaces 125, 225. (S12).

The image processing section (main CPU 103) may generate information in accordance with the image data as well as the image data, based on the output of the imaging device (108). The lens unit 10 may send the generated information to the body unit 20 via the bidirectional interfaces 123, 223 while sending the image data via the unidirectional interfaces 125, 225.

The information may be information on a format, a size, and the like of the image data generated in the lens unit 10 (hereinafter, referred to as "image data information"). The image data information is sent from the lens unit 10 to the body unit 20 via the first interface 14 (S13). A communication of the sending of the image data information is performed by a packet communication.

The image data information may be used as the above notification information.

In accordance with the received image data information, the body unit 20 performs allocating of work memory to be used in the image processing section 21 to the storage section 22 and a setting processing of the display section 23 (S14). After a completion of the setting processing, the body unit 20 sends setting completion notifying information to notify the completion of the setting processing to the lens unit 10 via the first interface 14 (S15).

After the lens unit 10 receives the setting completion notifying information from the body unit 20, the image processing section 12 sends the image data temporarily stored on the storage section 13 to the body unit 20 via the second interface 15 (S16).

The body unit 20 performs the predetermined image processings on the image data received from the lens unit 10, for example, by use of the notification information sent from the lens unit 10 in the image processing section 21 and a displaying processing of the processed image data using the display section 23 (S17).

The image data sending processing (S16) and the image data displaying processing (S17) are repeatedly performed until the release switch 211 is operated ("No" in S18). When the release switch 211 is operated ("Yes" in S18), data for a still image, which are data of an image formed in the imaging section 11, are read out from the imaging section 11 of the lens unit 10, and sent to the body unit 20 via the second interface 15, and a processing to store the image data, which are displayed on the display section 23, on the storage section 22 as the image file is performed (S19).

As mentioned above, in accordance with the imaging method according to this embodiment, the lens unit 10 may send the image data in a data format based on display performance of the display section 23 to the body unit 20, that is, the lens unit 10 generates the image data based on the display performance and so on in the display section 23 of the body unit 20 and sends predetermined information on the generated image data, for example, the image data information, to the body unit 20 before performing the image data sending processing, and thereby the body unit 20 can perform a prior processing regarding the image data to be sent from the lens unit 10.

Further, since the lens unit 10 is capable of setting the transfer rate of the unidirectional interface based on the image data to be sent, a reduction of power consumption can be achieved.

Furthermore, the image data are transferred by using the unidirectional interface, and thereby it is neither necessary that the data format of the image data be determined in advance nor that the data format and so on be limited, and the image data sending to the body unit 20 can be efficiently performed.

In addition, the first interface 14 has a coalition function with a DMA (Direct Memory Access), and thereby the first interface 14 may perform writing of received data on the memory and reading out of data to send the data from the memory without an intervention of the image processing section 12 and the image processing section 21. Accordingly, even if a communication via the first interface 14 is performed, the image processing section 12 and the image processing section 21 can perform different image processings, concurrently or at the same time.

Further, the image data may be periodically sent from the lens unit 10 to the body unit 20, and the body unit 20, for example the display section 23, may include a function to enlarge and display a part of the image data periodically received from the lens unit 10.

Second Embodiment

Next, a flow of a processing of a through-image displaying control in the lens unit and the imaging apparatus including the lens unit, according to an embodiment of the present invention, will be explained with reference to a sequence diagram of FIG. 7 as well as the functional block diagram of FIG. 5.

Here, the through-image indicates image data which are repeatedly displayed on the display section included in the body unit until an imaging operation is performed after the power of the imaging apparatus according to an embodiment of the present invention is switched on.

Figure 7:
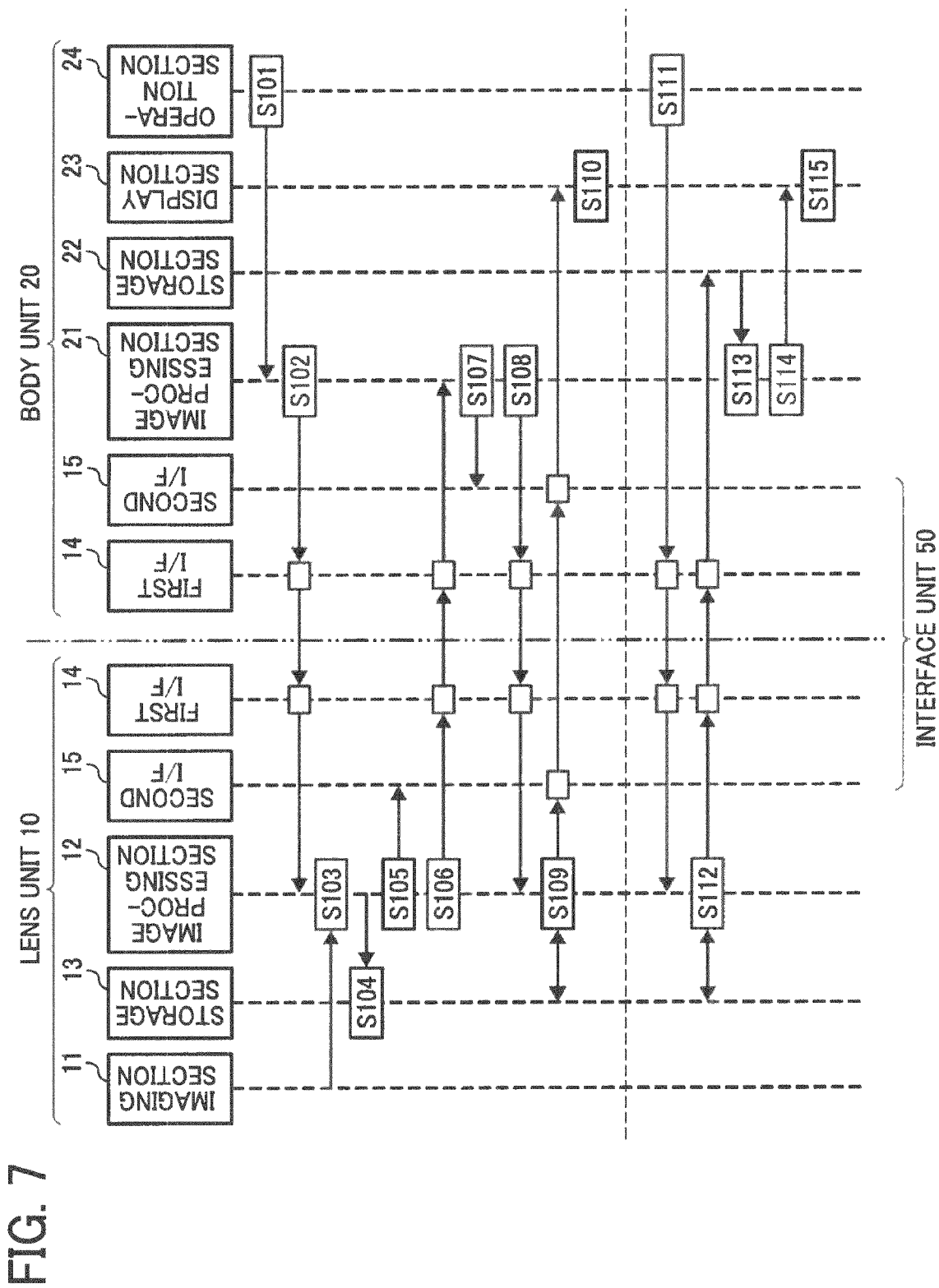
FIG. 7 is a sequence diagram showing an example of a flow of a processing of an imaging method used in the imaging apparatus according to the present invention.

In FIG. 7, processing steps will be described as S101, S102, S103 and so on, which are consecutive numbers. Further, a direction of output of generated information and a direction of output of processed information in the processing steps are indicated by arrows.

At first, when the power of the imaging apparatus is switched on or when the setting information is changed by an operation of the operation section 24 after the power is switched on, the sub CPU 205 (refer to FIG. 2) detects the operation (S101), setting information is generated by the image processing section 21, and the generated setting information is sent to the lens unit 10 via the first interface 14 (S102).

The setting information includes information such as the display performance of the display section 23, and a data format and an image size which are capable of being displayed on the display section 23.

The image processing section 12 generates image data based on data of an image formed in the imaging section 11, which are periodically output from the imaging section 11, in accordance with the received setting information (S103). The generated image data are temporarily stored and accumulated on the storage section 13 which is the ring buffer (S104).

Next, the image processing section 12 sets a data transfer clock speed of the second interface 15, which is the unidirectional interface, based on a frame rate, which is a period to read out the image data from the storage section 13 and to send the image data in accordance with the setting information, and an image data size per frame, which is determined in accordance with the setting information (S105).

As to the setting of the data transfer clock speed, the data transfer clock speed is controlled to be lowered in order to lower a data transfer rate, in a case where the frame rate of the image data read out from the storage section 13 is low or in a case where the image data size per frame is small.

Further, the data transfer clock speed is controlled to be heightened in order to heighten the data transfer rate, in a case where the frame rate of the image data read out from the storage section 13 is high or in a case where the image data size per frame is large.

Next, the image processing section 12 sends, via the first interface 14, send-preparation completing notification information to notify that a preparation processing before sending as mentioned above is completed (S106). The send preparation completing notification information includes information of a frame size of the through-image and a frame data format of the through-image, such as RGB and YUV.

After receiving the send-preparation completing notification information, the image processing section 21 sets a receiving buffer of the image data in the storage section 22, sets the image signal receiving port 225 (refer to FIG. 2) constituting the second interface 15 to be capable of receiving, and also performs a display setting of the display section 23, a setting of a video encoder, and a setting of a DMA controller (S107).

When the settings of the image signal receiving port 225 and so on are completed, the image processing section 21 notifies the image processing section 12 of the completion of the settings (S108). After the notifying processing of the image processing section 21, the image processing section 12 periodically sends the image data accumulated on the storage section 13 to the body unit 20 via the second interface 15 (S109). The display section 23 of the body unit 20 periodically displays the received image data (S110).

As mentioned above, in accordance with the lens unit and the imaging apparatus including the lens unit, according to this embodiment, information according to a hardware specification, such as the display performance of the display section 23, of the body unit 20 is notified to the lens unit 10 via the bidirectional interface, data necessary for displaying the through-image, such as the transfer rate of the image data set based on the information notified from the body unit 20 and the size of the image data to be transferred as the through-image, are notified from the lens unit 10 via the bidirectional interface, and the setting processing in accordance with each of the information is performed. Further, after the receiving preparation of the body unit 20 is completed, the through-image is capable of being sent from the lens unit 10 via the unidirectional interface.

As mentioned above, in accordance with the imaging method according to this embodiment, since different communication ports are used for the sending/receiving of the setting information and so on to be communicated between the lens unit and the body unit, and the sending of the image data from the lens unit to the body unit, the image data can be sent by a communication without interruption even during the sending/receiving of the information.

Further, since the transfer rate of the unidirectional interface is capable of being set based on the size and so on of the image data to be transferred as the through-image, an efficient interunit communication can be achieved, and a reduction of power consumption in the entire imaging apparatus can be also achieved.

Furthermore, even in a case where the lens unit is replaced by another lens unit to be used in the identical body unit, since the settings of the image data to be sent from the lens unit and the interface to be used for sending the image data are performed in accordance with the body unit, the imaging apparatus which is capable of connecting a variety of the lens units in accordance with an intended use can be achieved.

Third Embodiment

Next, in a case where a through-image is displayed by the processing mentioned above, a processing to display the through-image overlapped with a histogram of a luminance distribution will be explained with reference to FIG. 7.

In a case where the through-image is displayed (S110), when an operation to display a histogram of a luminance distribution of the through-image is performed by the operation section 24, the operation is notified to the image processing section 12 (S111).

When generating image data based on a periodic output from the imaging section 11 after receiving the above-mentioned notification, the image processing section 12 also generates data of a histogram of a luminance distribution of the image data. The generated image data are sent to the body unit 20 via the second interface 15 (S109), and the generated data of the histogram are sent to the body unit 20, with the same period as the image data being sent, via the first interface 14 (S112). The sent data of the histogram are stored on the storage section 22 via the DMA of the image processing section 21.

The image processing section 21 reads out the data of the histogram stored on the storage section 22 (S113), and outputs the data of the histogram to the display section 23 (S114). Accordingly, the histogram of the luminance distribution of the image data is displayed together with the image data, which is periodically displayed on the display section 23 (S115).

Figure 8:
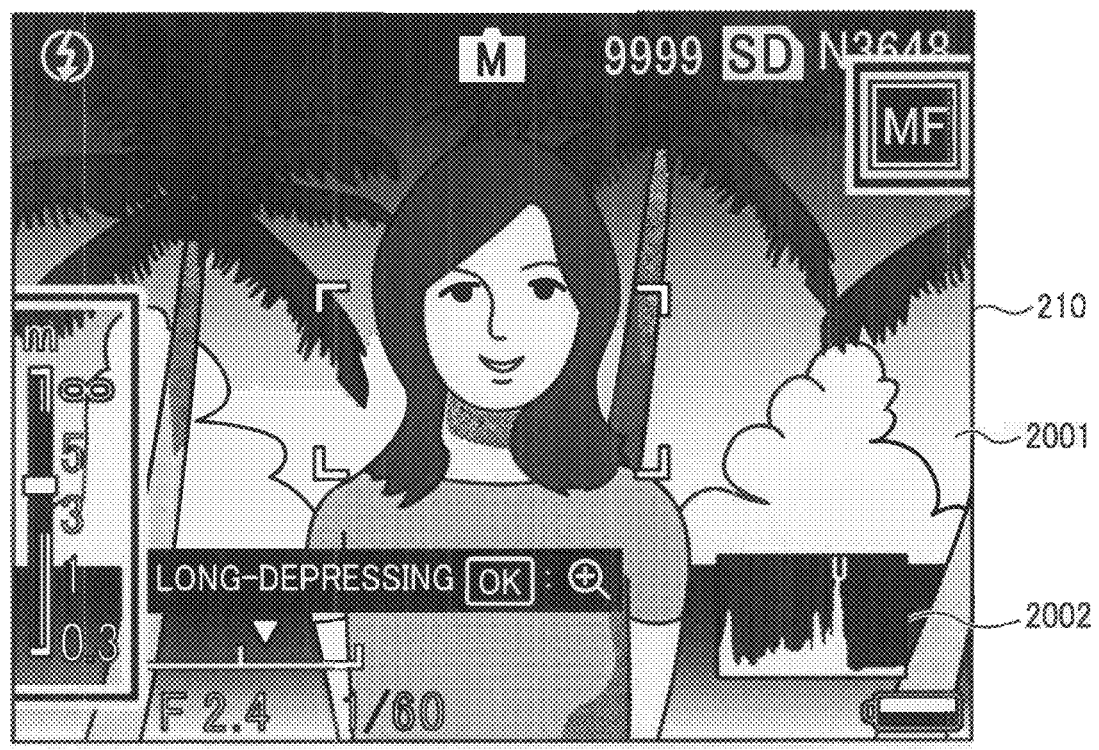
FIG. 8 is a view showing an example of display of image data in a body unit in an imaging method used in the imaging apparatus according to the present invention.

By the above processing, a display example in a case where a histogram of a luminance distribution of image data is displayed together with the image data is shown in FIG. 8. As shown in FIG. 8, a histogram 2002 of a luminance distribution of image data 2001 is displayed, overlapping a part of the image data 2001 displayed on the LCD 210 included in the body unit 200.

As mentioned above, in accordance with the lens unit and the imaging apparatus including the lens unit, according to this embodiment, in a case where the image data based on the data of the image formed in the imaging section 11, which are periodically output from the imaging section 11, are displayed on the display section 23, it is possible to display the histogram of the luminance distribution of the displayed image data on the display section 23, overlapping the image data, by instructing to display the histogram by a predetermined operation of the operation section 24 in the body unit 20.

In this embodiment, since the data of the histogram of the luminance distribution of the image data are generated in the lens unit 10 and sent to the body unit 20, it is not necessary to perform a complicated image processing in the image processing section 21 of the body unit 20, and it is possible to display the histogram as shown in FIG. 8.

In addition, since the data of the histogram are sent via the first interface 14, data volume to be sent via the second interface 15 is not changed, and performance in a through-image displaying processing is not lowered. Further, since the complicated image processing in the body unit 20 is not needed, it is possible to perform an efficient processing.

Fourth Embodiment

Next, a flow of a processing of a still image photographing control in the lens unit and the imaging apparatus including the lens unit, according to an embodiment of the present invention, will be explained with reference to a sequence diagram of FIG. 9 as well as the functional block diagram of FIG. 5.

Here, the still image indicates an image file which is stored on the storage section included in the body unit by an operation of the release switch in the imaging apparatus according to an embodiment of the present invention.

Figure 9:
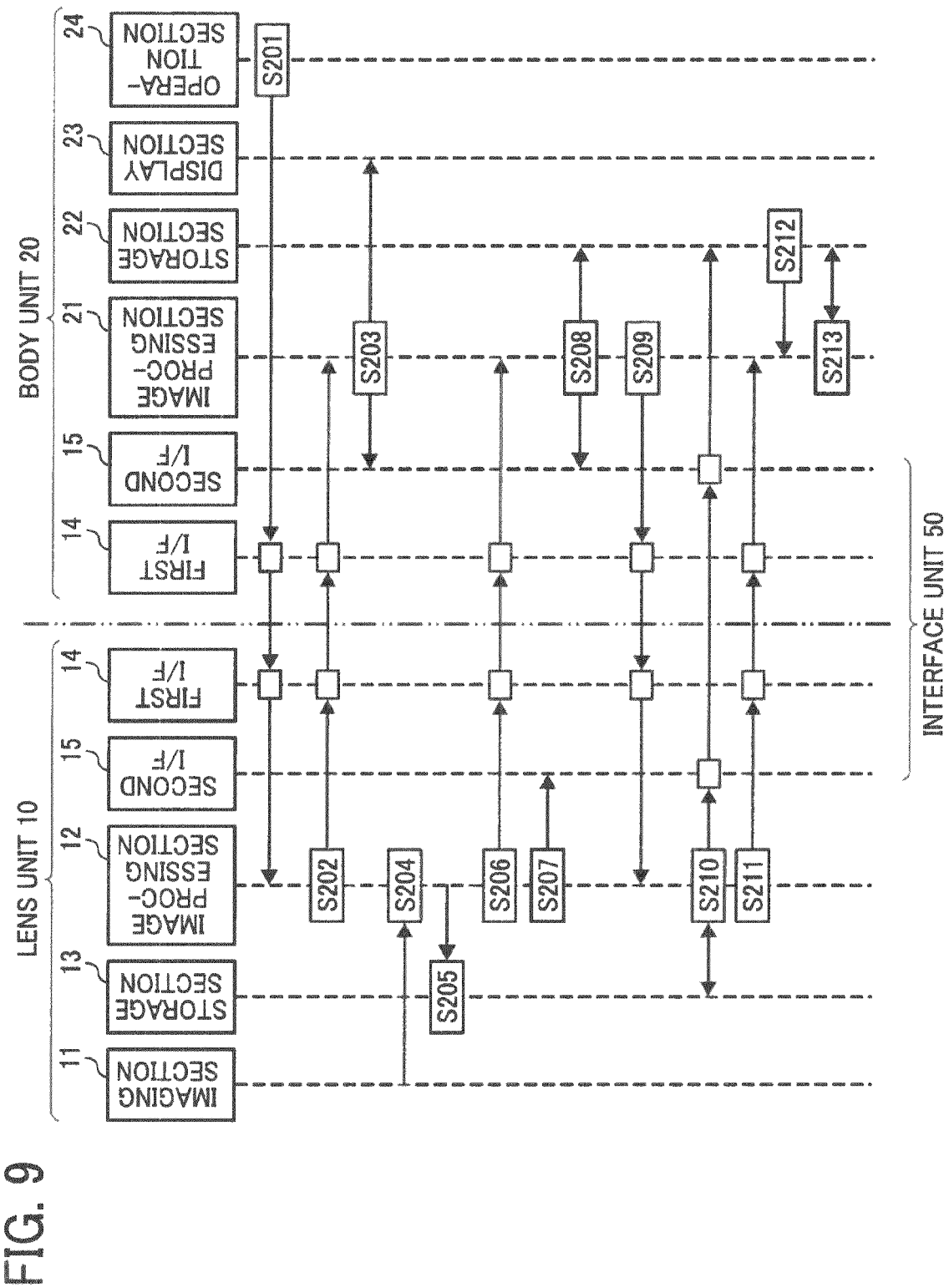
FIG. 9 is a sequence diagram showing another example of the flow of the processing of the imaging method used in the imaging apparatus according to the present invention.

In FIG. 9, processing steps will be described as S201, S202, S203 and so on, which are consecutive numbers. Further, a direction of output of generated information and a direction of output of processed information in the processing steps are indicated by arrows.

In a state where image data are periodically displayed, that is, a through-image is periodically displayed on the display section 23, when a predetermined imaging operation is performed via the operation section 24, the operation is notified to the image processing section 12 via the first interface 14 which is the bidirectional interface (S201).

The predetermined imaging operation is, for example, an operation of holding down the release switch 211 for a fixed time or longer.

Further, although it is not shown in a drawing, it may be also possible to directly notify the image processing section 12 of a signal from the release switch 211 (refer to FIG. 2) via the release switch signal output interface 226 (refer to FIG. 2).

After receiving the release switch operation notification mentioned above, the image processing section 12 stops sending the image data to be periodically sent to the body unit 20, and notifies the body unit 20 of the stoppage of sending of the image data (S202).

After receiving the image data sending stop notification, the image processing section 21 stops the operation of the display section 23, and performs a processing to disable the image signal receiving port 225 (S203).

After sending the image data sending stop notification to the body unit 20, the image processing section 12 generates image data based on an output of the imaging section 11 (S204) and stores the generated image data on the storage section 13 (S205).

Next, the image processing section 12 sends a send-preparation completing notification, which includes information of a data format of the generated image data, a data size of the generated image data, and so on, to the image processing section 21 via the first interface 14 (S206). A communication processing of the sending of the send-preparation completing notification is performed by the packet communication.

After sending the send-preparation completing notification, the image processing section 12 performs a setting of the second interface 15 and completes the send-preparation of the image data (S207).

Further, the image processing section 21 of the body unit 20 performs a setting of the RAM 220 (refer to FIG. 2), which is the receiving buffer, in accordance with the information included in the received send-preparation completing notification. Furthermore, the image processing section 21 performs a setting of the image signal receiving port 225 (refer to FIG. 2) constituting the second interface 15 and a setting of the DMA controller, and allows the second interface 15 to be capable of receiving (S208).

When the above-mentioned processings are completed, the body unit 20 notifies the lens unit 10 that the receiving preparation of the image data is completed (S209).

After receiving the above-mentioned notification, the image processing section 12 sends the image data stored on the storage section 13 to the body unit 20 via the second interface 15 (S210). The second interface 15 is not subject to the format of the data to be sent and is capable of sending the image data as mentioned above. Further, the second interface 15 may also send metadata of the image data, for example, tag data in a TIFF (Tagged Image File Format) format, and additional information of a photographing date and time, a photographing state, and so on in an EXIF (Exchangeable Image File Format) format. Furthermore, after the image data are converted into an image file in the image processing section 12, the second interface 15 may also send the image file.

After completing the sending of the image data, the image processing section 12 notifies the body unit 20 of a sending completion notification via the first interface 14 (S211).

After the body unit 20 receives the sending completion notification from the lens unit 10, interrupt notifying of a completion of storing the image data on the RAM 220 from the DMA controller included in the image processing section 21 arises (S212), and the body unit 20 completes the receiving processing of the image data sent from the lens unit 10.

In a case where the received image data are YUV data and where image processings such as a color correction and a luminance correction have been performed on the image data in the image processing section 12 of the lens unit 10, the image processing section 21 of the body unit 20 compresses the image data in the JPEG format by a JPEG encoder (not shown) and stores the compressed image data on a nonvolatile memory such as the SD memory card 215 constituting the storage section 22 as the image file (S213).

Further, in a case where the image processings such as the color correction and the luminance correction have not been performed on the received image data and where further image processings and corrections are needed, after performing the image processings such as the color correction and the luminance correction on the image data, the image processing section 21 of the body unit 20 compresses the image data in the JPEG format by the JPEG encoder, and stores the compressed image data on the nonvolatile memory such as the SD memory card 215 constituting the storage section 22 as the image file (S213).

Furthermore, in a case where the received image data are RAW data, after performing the image processings such as the color correction and the luminance correction on the image data, or without performing such image processings, the image processing section 21 of the body unit 20 converts the image data into data in an arbitrary RAW format, and stores the converted image data on the nonvolatile memory such as the SD memory card 215 constituting the storage section 22 as the image file (S213).

Moreover, in a case where the received image data are the RAW data, after performing the image processings such as the color correction and the luminance correction on the image data, the image processing section 21 of the body unit 20 converts the image data into the YUV data as needed, compresses the image data in the JPEG format by the JPEG encoder, and stores the compressed image data on the nonvolatile memory such as the SD memory card 215 constituting the storage section 22 as the image file (S213).

Further, in a case where the received image data are the RAW data and where the image processings such as the color correction and the luminance correction have been performed on the image data, after converting the image data into data in an arbitrary RAW file format, the image processing section 21 of the body unit 20 stores the converted image data on the nonvolatile memory such as the SD memory card 215 constituting the storage section 22 as the image file (S213).

Furthermore, in a case where the received image data are the RAW data and where the image processings such as the color correction and the luminance correction have been performed on the image data, the image processing section 21 of the body unit 20 converts the image data into the YUV data and compresses the converted image data in the JPEG format by the JPEG encoder, or the image processing section 21 of the body unit 20 compresses the image data, remaining in a state of the RAW data constituted of RGB, in the JPEG format by the JPEG encoder. Further, the image processing section 21 stores the compressed image data on the nonvolatile memory such as the SD memory card 215 constituting the storage section 22 as the image file (S213).

Moreover, in a case where the received image data are lossy data, for example, lossy compressed data in the JPEG format or the like, or lossless data, for example, lossless compressed data in a bitmap format, the TIFF format or the like, after adding, as needed, the metadata, for example, tags and so on in the EXIF format, and converting the image data into data in an arbitrary file format, the image processing section 21 of the body unit 20 stores the converted image data on the nonvolatile memory such as the SD memory card 215 constituting the storage section 22 as the image file (S213).

In accordance with the lens unit and the imaging apparatus including the lens unit, according to this embodiment explained above, the lens unit 10 and the body unit 20 perform the sending/receiving of the information regarding the photographing operation and generating of the image data via the bidirectional interface. Further, independently from the sending/receiving of the information, it is possible to send the image data from the lens unit 10 to the body unit 20 via the unidirectional interface.

Hereby, even if another communication processing is performed between the lens unit 10 and the body unit 20 while sending the image data, since it is possible to send the image data via an interface, which is different from an interface used for performing the communication processing, performance in the image data processing is not lowered. Further, a complicated image processing in the body unit 20 is not needed, and it is possible to perform an efficient processing.

Furthermore, in accordance with the imaging apparatus according to this embodiment, it is possible to use an arbitrary format in accordance with processing performance of the body unit 20 regarding the format of the image data to be sent from the lens unit 10 to the body unit 20.

Fifth Embodiment

Next, in the lens unit and the imaging apparatus including the lens unit, according to an embodiment of the present invention, a flow of a still image photographing control, including a display of a preview of a photographed image, will be explained with reference to a sequence diagram of FIG. 10 as well as the function block diagram of FIG. 5.

Figure 10:
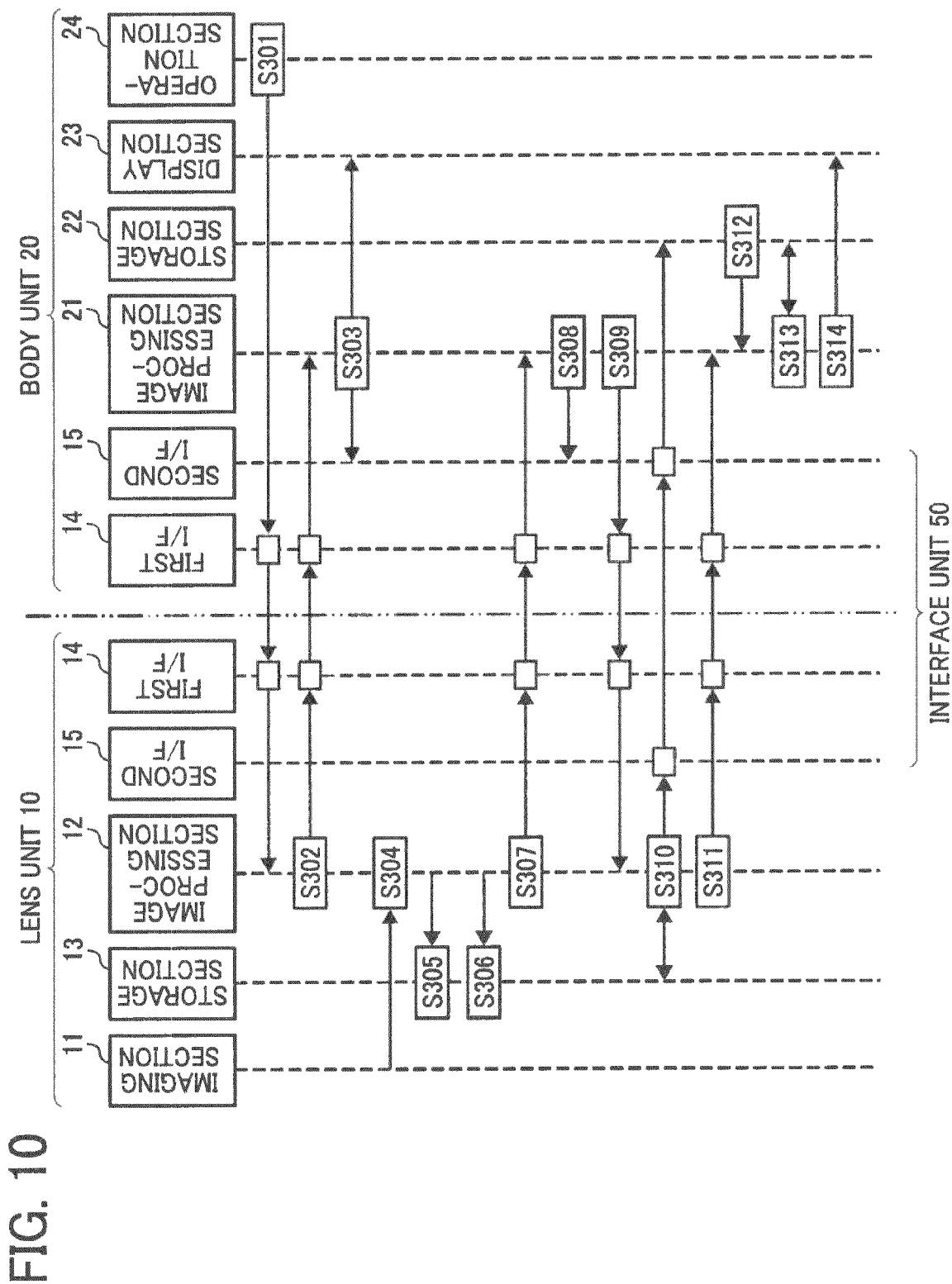
FIG. 10 is a sequence diagram showing another example of the flow of the processing of the imaging method used in the imaging apparatus according to the present invention.

In FIG. 10, processing steps will be described as S301, S302, S303 and so on, which are consecutive numbers. Further, a direction of output of generated information and a direction of output of processed information in the processing steps are indicated by arrows.

In a state where image data are periodically displayed, that is, a through-image is periodically displayed on the display section 23, when a predetermined imaging operation is performed via the operation section 24, the operation is notified to the image processing section 12 via the first interface 14, which is the bidirectional interface (S301).

The predetermined imaging operation is, for example, an operation of holding down the release switch 211 for a fixed time or longer.

Further, it may be also possible to directly notify the image processing section 12 of a signal from the release switch 211 (refer to FIG. 2) via the release switch signal output interface 226 (refer to FIG. 2).

After receiving the release switch operation notification mentioned above, the image processing section 12 stops sending the image data to be periodically sent to the body unit 20, and notifies the body unit 20 of the stoppage of sending of the image data (S302).

After receiving the image data sending stop notification, the image processing section 21 stops the operation of the display section 23, and performs a processing to disable the image signal receiving port 225 constituting the second interface 15 (S303).

After sending the image data sending stop notification to the body unit 20, the image processing section 12 generates image data based on data of an image formed in the imaging section 11, which are output from the imaging section 11 (S304) and stores the generated image data on the storage section 13 (S305). A data format of the image data is one of various image data formats such as the RAW format, the YUV format, or the JPEG format, and is determined in accordance with setting information received in advance from the body unit 20.

Further, after sending the image data sending stop notification to the body unit 20, and at the time of obtaining the data output from the imaging section 11, which are needed at least for the display of the preview of the photographed image, the image processing section 12 generates the image data based on the data output from the imaging section 11. Then, the image processing section 12 performs a thinning processing on the image data so that the image data has an arbitrary image size, converts the thinned image data into data in a predetermined image format, and stores the converted image data on the storage section 13 (S306).

Next, the image processing section 12 sends a preview send-preparation completing notification including information of a format of the image data for the preview of the photographed image and the like to the image processing section 21 via the first interface 14 (S307). A communication processing of the sending of the preview send-preparation completing notification is performed by the packet communication.

The image processing section 21 of the body unit 20 performs a setting of the RAM 220 (refer to FIG. 2), which is the receiving buffer, in accordance with the information included in the received preview send preparation completing notification. Further, the image processing section 21 performs a setting of the image signal receiving port 225 (refer to FIG. 2) constituting the second interface 15 and a setting of the DMA controller, and allows the second interface 15 to be capable of receiving (S308).

When the above-mentioned processings are completed, the body unit 20 notifies the lens unit 10 that the receiving preparation of the image data is completed (S309).

After receiving the notification mentioned above, the image processing section 12 sends the image data for the preview stored on the storage section 13 to the body unit 20 via the second interface 15 (S310).

After completing the sending of the image data for the preview, the image processing section 12 sends a sending completion notification to the body unit 20 (S311).

After the body unit 20 receives the sending completion notification of the image data for the preview from the lens unit 10, interrupt notifying of a completion of storing the image data for the preview on the RAM 220 from the DMA controller included in the image processing section 21 arises (S312), and the body unit 20 completes the receiving processing of the image data for the preview sent from the lens unit 10 (S313). Further, the image processing section 21 of the body unit 20 outputs the received image data for the preview to the display section 23 (S314).

In accordance with the lens unit and the imaging apparatus including the lens unit, according to this embodiment explained above, the lens unit 10 and the body unit 20 perform the sending/receiving of the information regarding the photographing operation and generating of the image data via the bidirectional interface. Further, independently from the sending/receiving of the information, it is possible to send the image data from the lens unit 10 to the body unit 20 via the unidirectional interface.

Hereby, even if another communication processing is performed between the lens unit 10 and the body unit 20 while sending the image data, since it is possible to send the image data via an interface, which is different from an interface used for performing the communication processing, performance in the image data processing is not lowered. Further, a complicated image processing in the body unit 20 is not needed, and it is possible to perform an efficient processing.

Sixth Embodiment

Next, a flow of a processing of a moving image recording control in the lens unit and the imaging apparatus including the lens unit, according to an embodiment of the present invention, will be explained with reference to a sequence diagram of FIG. 11 as well as the function block diagram of FIG. 5.

Figure 11:
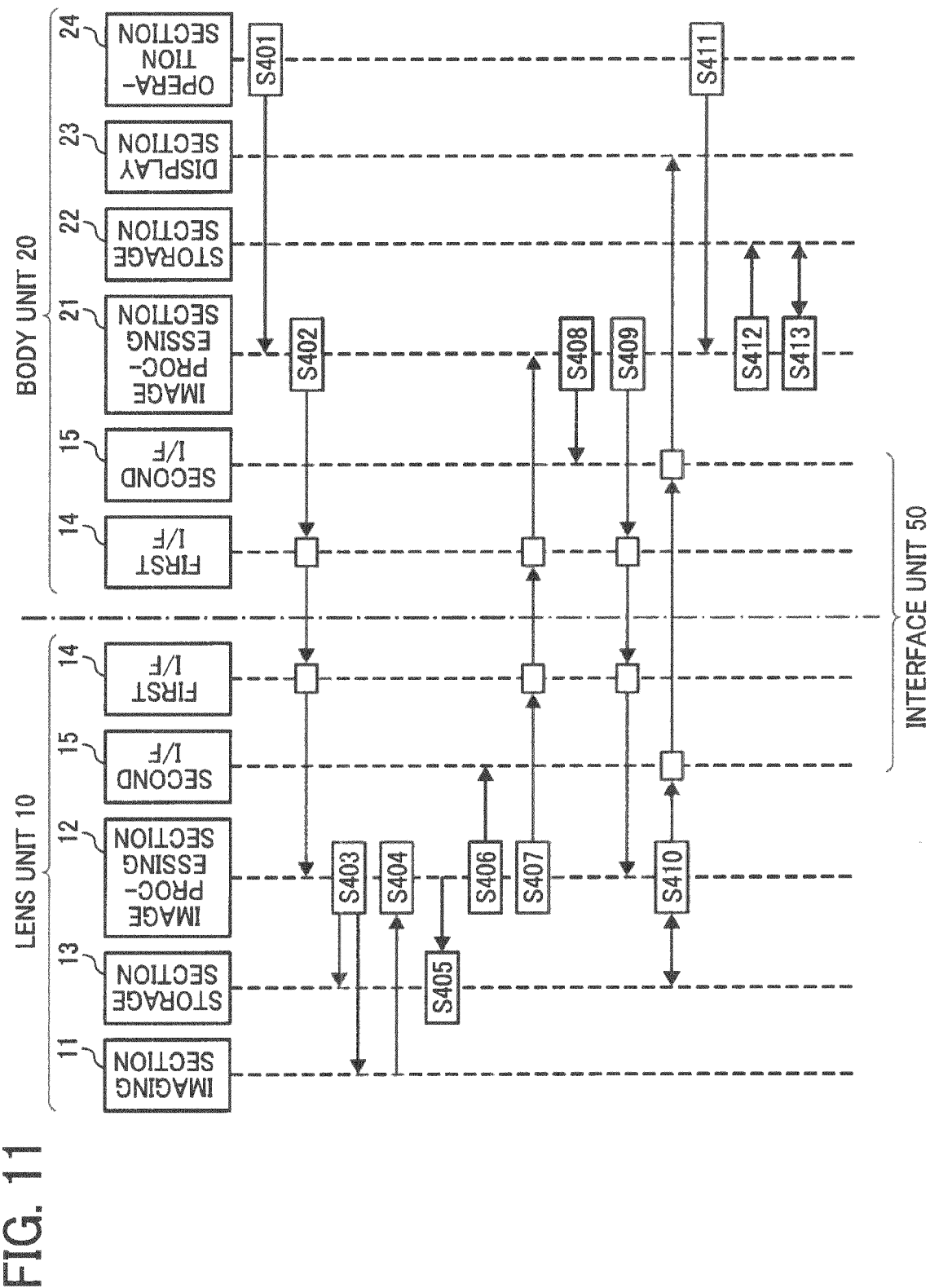
FIG. 11 is a sequence diagram showing another example of the flow of the processing of the imaging method used in the imaging apparatus according to the present invention.

In FIG. 11, processing steps will be described as S401, S402, S403 and so on, which are consecutive numbers. Further, a direction of output of generated information and a direction of output of processed information in the processing steps are indicated by arrows.

At first, after the power of the imaging apparatus is switched on, when an imaging mode is changed and set to a moving image recording mode by an operation of the operation section 24 (S401), information on an aspect ratio of a moving image, a frame size, that is, a horizontal and vertical size of the moving image, and so on, which is necessary for a moving image recording processing, (hereinafter, referred to as "moving image recording information") is generated in the image processing section 21, and the generated moving image recording information is sent to the image processing section 12 via the first interface 14 (S402).

In accordance with the received moving image recording information, the image processing section 12 performs a setting processing of the imaging section 11, allocating of a ring buffer area in the storage section 13, and other necessary settings of the image processing section 12 (S403), generates moving image data based on a periodic output from the imaging section 11 (S404), and accumulates the generated moving image data on the storage section 13 which is the ring buffer (S405).

Next, the image processing section 12 changes a data transfer clock speed of the second interface 15, which is the unidirectional interface, used for sending the moving image data to the body unit 20 based on a period to read out the moving image data from the storage section 13, that is, a frame rate of the moving image data, which is determined in accordance with moving image setting information, for example, the moving image recording information, and an image data size per frame (S406).

After completing the setting processing mentioned above, the image processing section 12 sends, via the first interface 14, send-preparation completing notification to the body unit 20 (S407). The send-preparation completing notification includes information of a frame size of a through-image for the moving image, a frame data format of the through-image, and so on.

After receiving the send-preparation completing notification, the image processing section 21 performs a setting of a receiving buffer of the moving image data and a setting of the image signal receiving port 225 (refer to FIG. 2) constituting the second interface 15. Further, the image processing section 21 performs a display setting of the display section 23, a setting of the video encoder, and a setting of the DMA controller, and allows the second interface 15 to be capable of receiving (S408).

After the receiving setting of the second interface 15 is completed, a setting completion notification is sent from the image processing section 21 to the image processing section 12 via the first interface 14 (S409). After receiving the notification, the image processing section 12 periodically sends the moving image data stored on the storage section 13 to the body unit 20 via the second interface 15. The display section 23 of the body unit 20 periodically displays the received moving image data (S410).

In a state where the moving image data are periodically displayed, that is, the through-image is periodically displayed on the display section 23, when a predetermined imaging operation is performed via the operation section 24, the operation is notified to the image processing section 21 (S411).

The predetermined imaging operation is, for example, an operation of holding down the release switch 211 for a fixed time or longer.

In accordance with the operation of the operation section 24 mentioned above, the image processing section 21 performs a setting, which is not shown in a drawing, of the audio codec 216. Further, the image processing section 21 allocates a ring buffer, which stores audio recorded data (audio bit stream) and encoded data of through-image data for a moving image recording (video bit stream), to the storage section 22 (S412), performs encoding of the moving image data periodically sent from the lens unit 10, and stores a moving image file in an arbitrary format on the storage section 22 (S413).

The above-mentioned moving image file storing processing is periodically performed in synchronization with a timer, interrupt of the receiving processing via the second interface 15, or the like. Further, a format of the video bit stream, for example MPEG4, Motion-JPEG, and so on, is selected in accordance with an intended use and a specification.

In accordance with the lens unit and the imaging apparatus including the lens unit, according to this embodiment explained above, the lens unit 10 and the body unit 20 perform the sending/receiving of the information regarding the moving image recording operation and generating of the moving image data via the bidirectional interface. Further, independently from the sending/receiving of the information, it is possible to send the moving image data from the lens unit 10 to the body unit 20 via the unidirectional interface.

Hereby, even if another communication processing is performed between the lens unit 10 and the body unit 20 while sending the moving image data, since it is possible to send the moving image data via an interface, which is different from an interface used for performing the communication processing, performance in the image data processing is not lowered. Further, a complicated image processing in the body unit 20 is not needed, and it is possible to perform an efficient processing.

Furthermore, in accordance with the imaging apparatus according to this embodiment, it is possible to use an arbitrary format in accordance with processing performance of the body unit 20 regarding a format of the moving image data sent from the lens unit 10 to the body unit 20.

In accordance with an embodiment of the present invention, since the lens unit and the body unit are capable of being connected by a plurality of different communication interfaces, the sending of the image data from the lens unit to the body unit can be efficiently performed.

Further, since it is possible to constitute a connection circuit using a generalized communication interface, a manufacturing cost can be reduced.

Furthermore, in accordance with an embodiment of the present invention, the communication interfaces of the lens unit and the body unit include the bidirectional communication interface and the unidirectional interface, and each of the interfaces is selectively used in accordance with an intended use. Therefore, a complicated handshake and a complicated protocol are not necessary between the lens unit and the body unit. Further, it is not necessary in the body unit to perform complicated image processing and the like on the image data received from the lens unit. Therefore, it is not necessary that the image data format be limited, and various image data can be handled.

Moreover, in accordance with an embodiment of the present invention, it is only necessary for the main CPU for the body unit, that is, the image processing engine to perform a processing in accordance with the information notified from the lens unit. Therefore, it is not necessary that the main CPU for the body unit hold in advance setting information and so on to handle a plurality of the lens units, and load of the main CPU for the body unit regarding setting and storing of information can be reduced.

In addition, in accordance with an embodiment of the present invention, since it is possible to dynamically set the transfer rate of the unidirectional interface to be used for sending the image data from the lens unit to the body unit at a transfer rate appropriate to the display performance of the body unit and the image data which are capable of being generated in the lens unit, wasteful power consumption can be reduced.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus, comprising:
   a lens unit;
   a body unit detachably attached to the lens unit; and
   an interface unit configured to connect the lens unit and the body unit so as to be capable of communicating with each other, the interface unit having a bidirectional interface and a unidirectional interface,
   wherein the lens unit includes an optical lens configured to transmit light from an object, an imaging device configured to form an image with the light, and an image processing section configured to generate image data based on an output of the imaging device; and
   wherein the lens unit is configured to
   receive setting information to be used in the image processing section for generating the image data, from the body unit via the bidirectional interface of the interface unit, the setting information including a display performance of a display section of the body unit, a data format and an image size,
   generate the image data based on the received setting information,
   send notification information to the body unit, via the bidirectional interface of the interface unit, to be used by the body unit for receiving the image data, and
   send the image data to the body unit via the unidirectional interface of the interface unit after sending the notification information to the body unit via the bidirectional interface of the interface unit.

2. The imaging apparatus according to claim 1,
   wherein the lens unit determines a data transfer rate of the unidirectional interface based on data volume of the image data to be sent via the unidirectional interface.

3. The imaging apparatus according to claim 1,
   wherein the image processing section generates information in accordance with the image data as well as the image data, based on the output of the imaging device; and
   wherein the lens unit sends the generated information to the body unit via the bidirectional interface while sending the image data to the body unit via the unidirectional interface.

4. The imaging apparatus according to claim 1,
   wherein the image data received from the lens unit are displayed on the display section; and
   wherein the lens unit sends the image data in the data format based on the display performance of the display section to the body unit.

5. The imaging apparatus according to claim 1,
   wherein the image data are lossless compressed data.

6. The imaging apparatus according to claim 1,
   wherein the image data are lossy compressed data.

7. The imaging apparatus according to claim 1,
   wherein the image data are periodically sent from the lens unit to the body unit; and
   wherein the body unit includes a function to enlarge and display a part of the image data periodically received from the lens unit.

8. The imaging apparatus according to claim 1,
   wherein the image data are in a computer-readable image file format.

9. The imaging apparatus according to claim 1,
   wherein the body unit includes a function to convert the image data into data in a computer-readable image file format and to record the data in the computer-readable image file format.

10. A lens unit which is detachably attached to a body unit constituting an imaging apparatus and connected so as to be capable of communicating with the body unit via an interface unit having a bidirectional interface and a unidirectional interface, comprising;
    an optical lens configured to transmit light from an object;
    an imaging device configured to form an image with the light; and
    an image processing section configured to generate image data based on an output of the imaging device,
    wherein setting information to be used in the image processing section for generating the image data, is received from the body unit via the bidirectional interface of the interface unit, the setting information including a display performance of a display section, a data format and an image size;
    wherein the image data based on the received setting information are generated;
    wherein notification information to be used by the body unit is sent to the body unit via the bidirectional interface of the interface unit; and
    wherein the image data are sent to the body unit via the unidirectional interface of the interface unit after sending the notification information to the body unit via the bidirectional interface of the interface unit.

11. The lens unit according to claim 10,
    wherein a data transfer rate of the unidirectional interface is determined based on data volume of the image data to be sent to the body unit.

12. The lens unit according to claim 10,
    wherein the image processing section generates information in accordance with the image data as well as the image data, based on the output of the imaging device; and
    wherein the generated information is sent to the body unit via the bidirectional interface while sending the image data to the body unit via the unidirectional interface.

13. The lens unit according to claim 10,
    wherein the image data are lossless compressed data.

14. The lens unit according to claim 10,
    wherein the image data are lossy compressed data.

15. The lens unit according to claim 10,
    wherein the image data are in a computer-readable image file format.

16. An imaging method used in an imaging apparatus including a lens unit, which has an optical lens configured to transmit light from an object, an imaging device configured to form an image with the light, and an image processing section configured to generate image data based on an output of the imaging device, a body unit which is detachably attached to the lens unit, and an interface unit configured to connect the lens unit and the body unit so as to be capable of communicating with each other, the interface unit having a bidirectional interface and a unidirectional interface, the method comprising the steps of:

receiving setting information to be used in the image processing section for generating the image data, from the body unit via the bidirectional interface of the interface unit, the setting information including a display performance of a display section of the body unit, a data format and an image size;

generating the image data based on the received setting information;

sending notification information to the body unit, via the bidirectional interface of the interface unit, to be used by the body unit for receiving the image data; and sending the image data to the body unit via the unidirectional interface of the interface unit after sending the notification information to the body unit via the bidirectional interface of the interface unit.

17. The imaging method according to claim 16 further comprising the step of:

determining a data transfer rate of the unidirectional interface based on data volume of the image data to be sent via the unidirectional interface before sending the image data to the body unit via the unidirectional interface.

18. The imaging method according to claim 16 further comprising the steps of:

generating information in accordance with the image data as well as the image data, based on the output of the imaging device; and sending the generated information to the body unit via the bidirectional interface while sending the image data to the body unit via the unidirectional interface.

19. The imaging method according to claim 16, wherein the image data received from the lens unit are displayed on the display section; and wherein the method further comprises the step of sending the image data in the data format based on the display performance of the display section to the body unit.

20. The imaging method according to claim 16, wherein the image data are periodically sent from the lens unit to the body unit; and wherein the method further comprises the step of enlarging and displaying a part of the image data periodically received from the lens unit.

\* \* \* \* \*